(12) United States Patent
Lin

(10) Patent No.: US 8,892,751 B2
(45) Date of Patent: Nov. 18, 2014

(54) METHOD, SYSTEM AND NETWORK ENTITY FOR NEGOTIATING THE SESSION DESCRIPTION PROTOCOL VERSION AND OBTAINING THE SESSION DESCRIPTION PROTOCOL VERSION INFORMATION

(75) Inventor: Yangbo Lin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 364 days.

(21) Appl. No.: 12/424,216

(22) Filed: Apr. 15, 2009

(65) Prior Publication Data

US 2009/0198821 A1     Aug. 6, 2009

Related U.S. Application Data

(63) Continuation of application No. PCT/CN2007/002952, filed on Oct. 15, 2007.

(30) Foreign Application Priority Data

Oct. 16, 2006  (CN) .......................... 2006 1 0131989

(51) Int. Cl.
*G06F 15/16* (2006.01)
*H04L 29/06* (2006.01)

(52) U.S. Cl.
CPC ............ *H04L 65/1069* (2013.01); *H04L 69/24* (2013.01)
USPC ........................................................ 709/228

(58) Field of Classification Search
CPC .............. H04L 29/06537; H04L 69/24; H04L 65/1069; H04L 29/06326
USPC ........................................................ 709/228
See application file for complete search history.

(56) References Cited

U.S. PATENT DOCUMENTS 5,826,027 A    10/1998 Pedersen et al.
7,200,384 B1*  4/2007 Tervo et al. ................. 455/414.1

(Continued)

FOREIGN PATENT DOCUMENTS

| CN | 1773988 | 5/2006 |
| CN | 1773988 A | 5/2006 |
| EP | 1753189 A1 | 2/2007 |
| WO | WO-02098096 | 12/2002 |

OTHER PUBLICATIONS

Written Opinion of the International Searching Authority issued in corresponding PCT Application No. PCT/CN2007/002952; issued Jan. 17, 2008.

(Continued)

*Primary Examiner* — Ninos Donabed
*Assistant Examiner* — Thomas Richardson
(74) *Attorney, Agent, or Firm* — Brinks Gilson & Lione

(57) ABSTRACT

A method, system and network entity for negotiating a session description protocol (SDP) version improve a negotiation process where two communication parties negotiate an SDP version supported by both applications. Especially when the H.248 protocol is applied, by extending of a property parameter, the negotiation process between a media gateway controller and a media gateway can be achieved easily. A method, system and network entity for obtaining information of an SDP version allow one communication party to obtain information of an SDP version supported by the other party from the other party. Especially when the H.248 protocol is applied, by extending the property parameter, the media gateway controller may obtain the information of the SDP version supported by the media gateway easily.

5 Claims, 3 Drawing Sheets

(56) References Cited

U.S. PATENT DOCUMENTS

| | | | | |
|---|---|---|---|---|
| 7,305,681 | B2* | 12/2007 | Khartabil | 719/328 |
| 7,821,965 | B2* | 10/2010 | Clemm et al. | 370/254 |
| 7,876,745 | B1* | 1/2011 | Stewart et al. | 370/356 |
| 2003/0235184 | A1* | 12/2003 | Dorenbosch et al. | 370/352 |
| 2004/0243703 | A1* | 12/2004 | Demmer et al. | 709/224 |
| 2004/0250253 | A1* | 12/2004 | Khartabil | 719/310 |
| 2005/0060411 | A1 | 3/2005 | Coulombe et al. | |
| 2005/0265384 | A1 | 12/2005 | Fernandes et al. | |
| 2006/0077954 | A1* | 4/2006 | Monk et al. | 370/352 |
| 2008/0165787 | A1* | 7/2008 | Xu et al. | 370/395.2 |
| 2008/0250146 | A1* | 10/2008 | Arwe et al. | 709/227 |
| 2009/0070484 | A1* | 3/2009 | Ewert et al. | 709/236 |

OTHER PUBLICATIONS

Supplementary European Search Report issued in corresponding European Patent Application No. 07 81 6566; issued Jul. 1, 2010.

Handley, M., et al. "SDP Session Description Protocol" The Internet Society. Apr. 1998.

Olson, S. et al. Support for IPv6 in Session Description Protocol (SDP). The Internet Society. Jun. 2002.

Andreasen, F. SDP Capability Negotiation draft-andreasen-mmusic-sdp-capability-negotiation00.txt. Jul. 19, 2006.

Handley, M. et al. "SDP: Session Description Protocol" The Internet Society. Jul. 2006.

Kaplan, H. Session Description Protocol (SDP) Offer/Answer Negotiation for Best—Effort Secure Real Time Transport Protocol draft-kaplan-mmusic-best-effort-srtp-01.txt, Oct. 2006.

"Series H: Audiovisual and Multimedia Systems Infrastructure of Audiovisual Services-Communication Procedures" International Telecommunication Union. Sep. 2005.

Office Action issued in corresponding Chinese Patent Application No. 200810189673.0, mailed Jul. 21, 2011.

Office Action issued in corresponding European Patent Application No. 07816566.9, mailed Jul. 22, 2011.

* cited by examiner

METHOD, SYSTEM AND NETWORK ENTITY FOR NEGOTIATING THE SESSION DESCRIPTION PROTOCOL VERSION AND OBTAINING THE SESSION DESCRIPTION PROTOCOL VERSION INFORMATION

CROSS-REFERENCE TO RELATED APPLICATIONS

This application is a continuation of International Patent Application No. PCT/CN2007/002952, filed on Oct. 15, 2007, which claims the benefit of Chinese Patent Application No. 200610131989.5, filed on Oct. 16, 2006, both of which are hereby incorporated by reference in their entireties.

FIELD OF THE INVENTION

The present invention relates to communication technologies, and more particularly, to a method, system and network entity for negotiating a session description protocol (SDP) version, and a method, system and network entity for obtaining information of the session description protocol version.

BACKGROUND

A Media gateway controller (MGC) and a media gateway (MG) are two key components in a packet network. The MGC has call control function and the MG has service bearing function, thereby achieving separation of a call control plane and a service bearing plane. In this way, network resources can be shared sufficiently, device upgrading and service expansion can be simplified, and the development and maintenance cost can be reduced dramatically. For example, FIG. 1 illustrates a networking schematic diagram of MG and MGC in the next generation network (NGN). A communication protocol between MGs is the Real-time Transport Protocol (RTP), and communication protocols between MG and MGC that are widely employed currently include the H.248/Gateway Control Protocol (MeGaCo) and the Media Gateway Control Protocol (MGCP). The MGCP version 1 was developed by the Internet Engineering Task Force (IETF) in October, 1999 and was amended in January, 2003. The H.248/MeGaCo version 1 was developed by the IETF and the International Telecommunications Union (ITU) together in November, 2000 and was amended in June, 2003. The H.248 version 2 was developed by the ITU in May, 2002 and was amended in March, 2004. The H.248 version 3 was developed by the ITU in September, 2005.

Taking H.248 as an example, the various resources on the MG are abstracted as terminations. Terminals can be grouped into physical terminations and temporary terminations. The former represent some physical terminations having semi-permanent existence, such as a time division multiplex (TDM) channel, and the later represent some public resources that are applied for temporarily and will be released after use, such as an RTP stream. Further, the MG is overall represented by a root termination. A combination between terminations is abstracted as a context. The context may include a plurality of terminations. Therefore, the association among terminations is described as a topology. For a termination not associated with another termination yet, it is contained in a special context known as Null context.

For such abstract model based on a protocol, a call connection is actually an operation upon the termination and the context. Such operation is implemented by request and response for a command between the MGC and MG. Types of the command include Add, Modify, Subtract, Move, Audit Value, Audit Capability, Notify, and Service Change. Command parameters, also referred to as descriptors, are classified into property, signal, event, and statistic, etc. Parameters indicating service dependency are aggregated into a packet logically.

The H.248 uses local and remote descriptors to negotiate media parameters, wherein a local descriptor defines parameters of a locally received media, and a remote descriptor defines parameters of a remotely received media, such as a receiving address, a receiving port, and a media type, etc. By default, the H.248 uses the session description protocol (SDP) of the Request for Comments (RFC) 2327 developed by the IETF to describe these media parameters in the local and remote descriptors. However, the RFC3266 developed by the IETF additionally is update of the RFC2327 for supporting IPv6, and the IETF amended the SDP in the recently developed RFC4566, causing change of the protocol syntax. When the MGC uses RFC4566 in the call/session control, the MGC is required to use RFC4566 in controlling the MG.

In such a situation, the backward compatibility may not be achieved by a scheme of simply changing the SDP referenced in the H.248 from RFC2327 to RFC4566. Since the existing version negotiation mechanism of the H.248 does not define a negotiation mechanism relating to the SDP version, the existing version negotiation mechanism of the H.248 cannot enable the MGC and MG that do not both support the new RFC4566 to achieve backward compatibility, i.e., falling back to use the old RFC2327.

SUMMARY

The present invention provides a method, system and network entity for negotiating a session description protocol (SDP) version, to solve the problem that two communication parties cannot negotiate an SDP version supported by both applications in the prior art.

The present invention further provides a method, system and network entity for obtaining information of an SDP version, to solve the problem of how a communication party obtains information of an SDP version supported by another communication party in the prior art.

To solve the above technical problems, the present invention provides the following technical schemes.

A method for negotiating an SDP version includes the following steps:

a first network entity selects an SDP version to be used, the SDP version being supported by both the first network entity and a second network entity; and the first network entity informs the second network entity of corresponding information of the SDP version to be used.

The method further includes the following steps:

the first network entity requests the second network entity for information of an SDP version supported by the second network entity; and the second network entity returns information of an SDP version supported by the second network entity to the first network entity in response to the request.

Further, the first network entity periodically requests the second network entity for information of the SDP version supported by the second network entity.

In this method, the first network entity uses information, requested each time, of the SDP version supported by the second network entity for selecting an SDP version to be used with the second network entity.

Or, the information of the SDP version supported by the second network entity is preset in the first network entity.

Further, the second network entity returns a response indicative of a success in SDP version negotiation to the first network entity after it is confirmed that the SDP version to be used is supported.

Further, the second network entity returns a response indicative of a failure in SDP version negotiation to the first network entity after it is confirmed that the SDP version to be used is not supported.

The SDP version to be used is a highest-level SDP version supported by both the first network entity and the second network entity.

According to the method of the present invention, the first network entity and the second network entity communicate with each other by using the H.248 protocol.

When the first network entity requests the second network entity for the information of the SDP version supported by the second network entity, the request sent from the first network entity to the second network is an audit capability command request carrying a property parameter representing an SDP version, and the second network entity carries information of an SDP version supported by the second network entity according to the audit capability command request as a value of the property parameter representing an SDP version in a command response corresponding to the command request and returns the command response to the first network entity.

Moreover, when the first network entity informs the second network entity of the information of the SDP version, the first network entity carries the information of the SDP version to be used as a value of the property parameter representing an SDP version in the command request and returns the command request to the second network entity.

The present invention further provides a system for negotiating an SDP version including a first network entity and a second network entity, wherein the first network entity includes a module configured to select an SDP version to be used that is supported by both the first network entity and the second network entity, and a module configured to send information of the SDP version to be used to the second network entity.

The first network entity further includes a module configured to request the second network entity for information of an SDP version supported by the second network entity; the second network entity further includes a module configured to return information of an SDP version supported by the second network entity to the first network entity according to the request.

The first network entity further includes a first storage module configured to store preset information of all SDP versions supported by the second network entity, wherein the first network entity selects the SDP version to be used according to the preset information of the SDP versions supported by the second network entity in the first storage module.

The second network entity further includes: a module configured to receive the information of the SDP version to be used.

The second network entity further includes:

a module configured to return a response of indicative of a success in negotiation to the first network entity when it is confirmed that the SDP version to be used is supported; and/or a module configured to return a response indicative of a failure in negotiation to the first network entity when it is confirmed that the SDP version to be used is not supported.

The first network entity is a media gateway controller, and the second network entity is a media gateway, wherein the media gateway controller and the media gateway communicate with each other by using the H.248 protocol.

In addition, the present invention also provides a method for obtaining information of an SDP version, including the following steps:

a first network entity requests a second network entity for information of an SDP version supported by the second network entity; and the first network entity receives a response to the request returned from the second network entity, wherein the response includes information of an SDP version supported by the second network entity.

The first network entity and the second network entity communicate with each other by using the H.248 protocol.

According to the H.248 protocol, the request sent from the first network entity to the second network is an audit capability command request carrying a property parameter representing an SDP version; the second network entity carries information of an SDP version supported by the second network entity according to the audit capability command request as a value of the property parameter representing an SDP version in a command response corresponding to the command request and returns the command request to the first network entity.

The present invention further provides a system for obtaining information of an SDP version, including a first network entity and a second network entity, wherein:

the first network entity includes a module configured to request the second network entity for information of an SDP version supported by the second network entity; and the second network entity includes a module configured to return information of an SDP version supported by the second network entity to the first network entity according to the request.

Further, the first network entity also includes a first transceiving module configured to send the request; the second network entity also includes a second transceiving module configured to receive the request and sending the information of the SDP version.

The first network entity is a media gateway controller, and the second network entity is a media gateway, wherein the media gateway controller and the media gateway communicate with each other by using the H.248 protocol.

In addition, the present invention also provides network entities in the system above.

The advantages of the present invention are as follows.

Through a first network entity selecting an SDP version to be used that is supported by both the first network entity and a second network entity, and informing the second network entity of information of the SDP version, the method, system and network entity for negotiating an SDP version according to the present invention allow two communication parties to negotiate an SDP version supported by both applications. Especially when the H.248 protocol is applied, by extending of a property parameter, the negotiation process between the media gateway controller and the media gateway can be easily achieved.

Through a first network entity requesting a second network entity for the information of the SDP version supported by the second network entity, and obtaining the information of the SDP version supported by the second network entity, the method, system and network entity for obtaining information of an SDP version according to the present invention allow a communication party to obtain information of an SDP version supported by the other communication party. Especially when the H.248 protocol is applied, by extending of a property parameter, the media gateway controller may easily obtain information of the SDP version supported by the media gateway.

DETAILED DESCRIPTION

Figure 1:
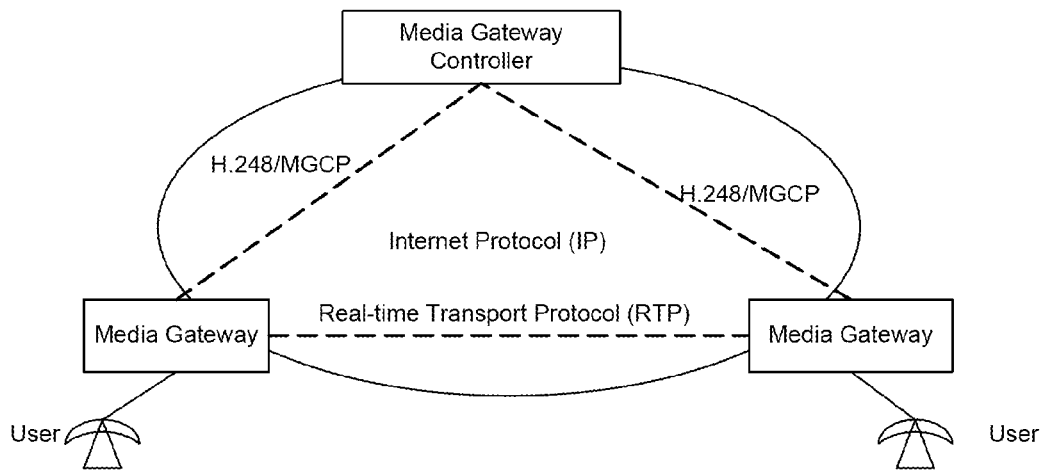
FIG. 1 is a diagram of a networking of an MG and an MGC in an NGN in the prior art.

First, the present invention provides the following technical concept for a first network entity and a second network entity that are in communication to negotiate an SDP version supported by both applications.

The first network entity selects an SDP version supported by both the first network entity and the second network entity, and sends the corresponding information of the SDP version to the second network entity.

The second network entity receives the information of the SDP version, and returns a success response of SDP version negotiation to the first network entity after it is confirmed that the corresponding SDP version is supported.

Of course, the second network entity may return a response indicative of a failure in SDP version negotiation to the first network entity after it is confirmed that the corresponding SDP version to be used is not supported by the second network entity; or, the second network entity does not return a response indicative of a success in negotiation to the first network entity after it is confirmed that the corresponding SDP version is supported, but return a response indicative of a failure in negotiation to the first network entity after it is confirmed that the corresponding SDP version to be used is not supported by the second network entity.

In the above concept, the first network entity needs to consider all SDP versions supported respectively by the first network entity and the second network entity when selecting the SDP version to be used. The SDP versions supported by the first network entity itself are known, and there are two methods for obtaining SDP versions supported by the second network entity as described below.

1. The first network entity requests the second network entity for information of an SDP version supported by the second network entity, including the following steps: the first network entity requests the second network entity for information of the SDP version supported by the second network entity; the second network entity informs the first network entity of information of an SDP version supported by the second network entity in response to the request.

In this method, the first network entity may request the second network entity for information of the supported SDP version(s) once for all.

The first network entity may also request the second network entity for information of the supported SDP version periodically. Here, the updating period may be set to a specific time period, or to times of communications with the second network entity.

2. Information of all SDP versions supported by the second network entity is preset in the first network entity.

According to a second method, configuration and updates are implemented mainly by an operation and maintenance system (e.g., a command line, a network administrator, etc.) to ensure the correctness of the information stored in the first network entity.

The update of the SDP version supported by the second network entity obtained by the first network entity will be used for subsequent selection of the SDP version to be used.

The first method above is taken as an example below to further illustrate how to implement the method for negotiating an SDP version according to an embodiment of the present invention between a first network entity and a second network entity that are in communication by using the H.248 protocol.

According to the H.248 protocol, a property parameter, e.g., a version parameter affiliated with an SDP version packet, is extended for representing the supported SDP version. The value of the property parameter is an integer, and may use directly the RFC number used by the IETF to define the SDP, e.g., a value, 2327, represents that RFC2327 is supported, a value, 3266, represents that RFC3266 is supported (and implies that RFC2327 is also supported), and a value, 4566, represents that RFC4566 is supported. The default value is 2377. The property parameter of the SDP version is a termination state parameter configured in a termination state of the root termination, and is a readable and writeable parameter.

Figure 2:
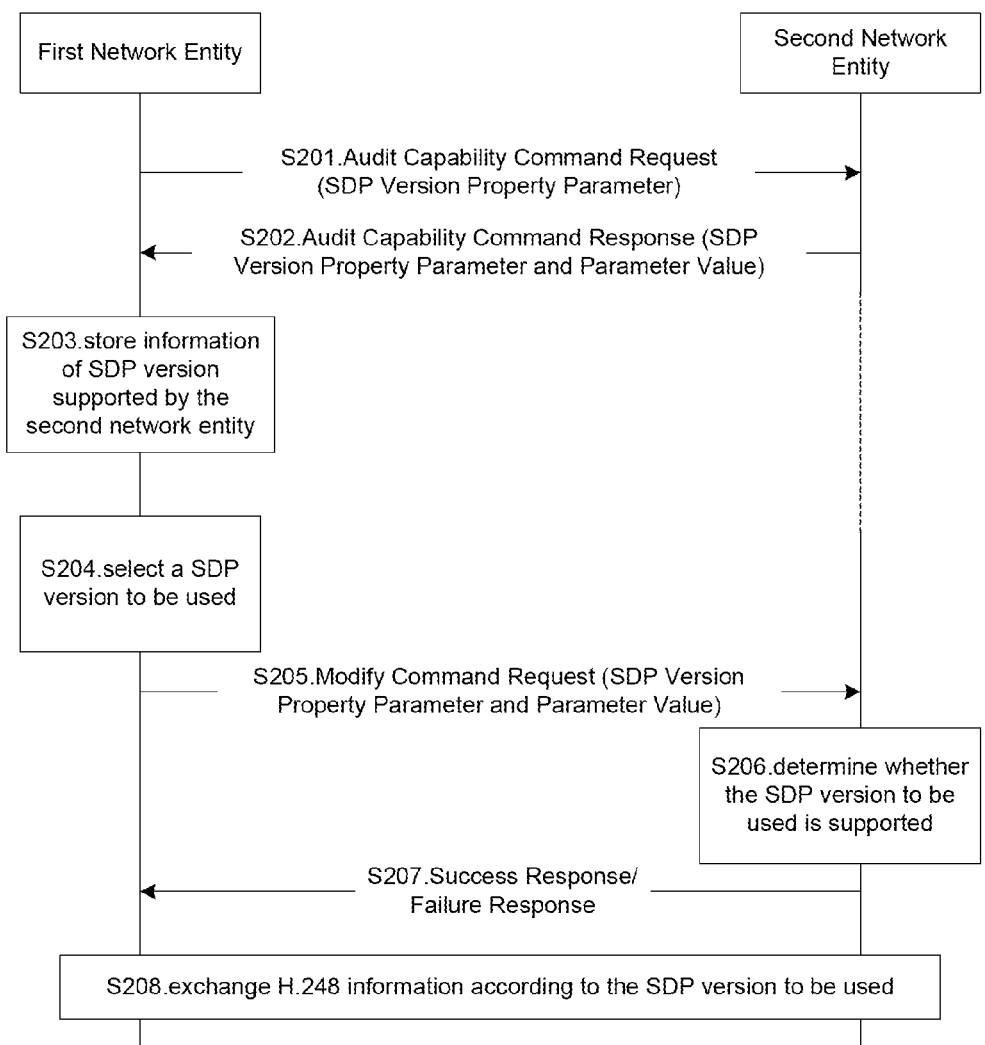
FIG. 2 is a main flowchart of a method for negotiating a session description protocol (SDP) version according to an embodiment of the present invention.

As illustrated in FIG. 2, the method for negotiating an SDP version according to an embodiment the present invention includes the following steps.

If the first network entity has not locally stored information of the SDP version supported by the second network entity yet, the information of the SDP version supported by the second network entity is obtained and stored through steps S201~S203; otherwise, the process proceeds to step S204 directly to start negotiation.

Of course, the first network entity may perform S201~S203 each time before negotiation to obtain the information of the SDP version supported by the second network entity, and then perform step S204.

Step S201: The first network entity sends an audit capability command request to the second network entity, the audit capability command request carrying the above property parameter representing the SDP version.

Step S202: According to the audit capability command request, the second network entity returns the information of the SDP version supported by the second network entity to the first network entity as carried in a command response corresponding to the command request, wherein a property parameter representing the SDP version is provided in the command response, and the information of the SDP version supported by the second network entity is used as the value of the property parameter, e.g., 2327, 4566, etc.

Step S203: The first network entity stores locally the received information of the SDP version supported by the second network entity.

Step S204: The first network entity selects an SDP version to be used from the SDP versions supported by both the first network entity and the second network entity, and preferably, the SDP version selected to use is a highest-level SDP version supported by both the first network entity and the second network entity.

Step S205: The first network entity sends the corresponding information of the SDP version to the second network entity as carried in a command request, wherein the above property parameter representing the SDP version is provided in the command request, and the information of the selected SDP version is set as the value of the property parameter, e.g., 4566, etc.

Step S206: The second network entity determines whether the corresponding SDP version is supported.

Step S207: If the corresponding SDP is supported, a success response of negotiation is returned to the first network entity; otherwise a failure response of negotiation is returned, wherein the success response of negotiation is a success command response, and the failure response of negotiation is a failure command response (including corresponding error code and/or error description).

Step S208: The first network entity and the second network entity employ the SDP version selected to use to exchange H.248 information.

Here, the first network entity may request the second network entity for information of the supported SDP version only once or periodically.

A scenario for applying the above technical scheme is that the first network entity is an MGC, the second network entity is an MG, and they negotiate an SDP version to be used after control association is established.

If the MGC desires to determine the SDP version possibly supported by the MG, the MGC should send an audit capability command request with respect to the above property parameter to the MG, and then the MG returns the SDP version supported by the MG to the MGC in a corresponding command response. If the MGC requires the MG to use a specific SDP version, the MGC should send a modify command request to the MG for configuring the value of the above property parameter to a value corresponding to the specific SDP version. After the MG returns a success reply in a corresponding command response, the MGC and MG can use the specific SDP version in the local and remote descriptors. If the MG determines that the value of the property parameter of the SDP version configured by the MGC contains invalid or undesirable syntax, the MG will return corresponding error information to the MGC, including error code and/or error text description.

Once the specific SDP version is set, the MG replaces all references to RFC2327 in the H.248 with the specific SDP version. In addition, for backward compatibility of the MGC and MG, they should support RFC2327 even though they support a new SDP version.

An example of typical application is as follow.

After the control association is established between the MGC and MG, if the MGC wants to use an SDP version (e.g., RFC4566) rather than RFC2377 without knowing whether it is supported by the MG, the MGC sends an audit capability command request with respect to the above version property parameter of an SDP version packet to the MG, and then the MG returns the value of the version property parameter of the SDP versions packet in a corresponding command response as a list including 2327 and 3266, i.e., the MG supports RFC2327 or RFC3266, but does not support RFC4566. Based on the understanding of the SDP version supported by the MG, if the MGC decides to use RFC3266, the MGC sends a modify command request with respect to the above version property parameter of the SDP version packet to the MG for configuring the value of the parameter to 3266. After the MG returns a success reply in a corresponding command response, the MGC and MG may use RFC3266.

Reference can be made to steps S204~S208 for a method for presetting the information of the SDP version supported by the second network entity in the first network entity, and detailed description thereof will not be repeated herein.

Figure 3:
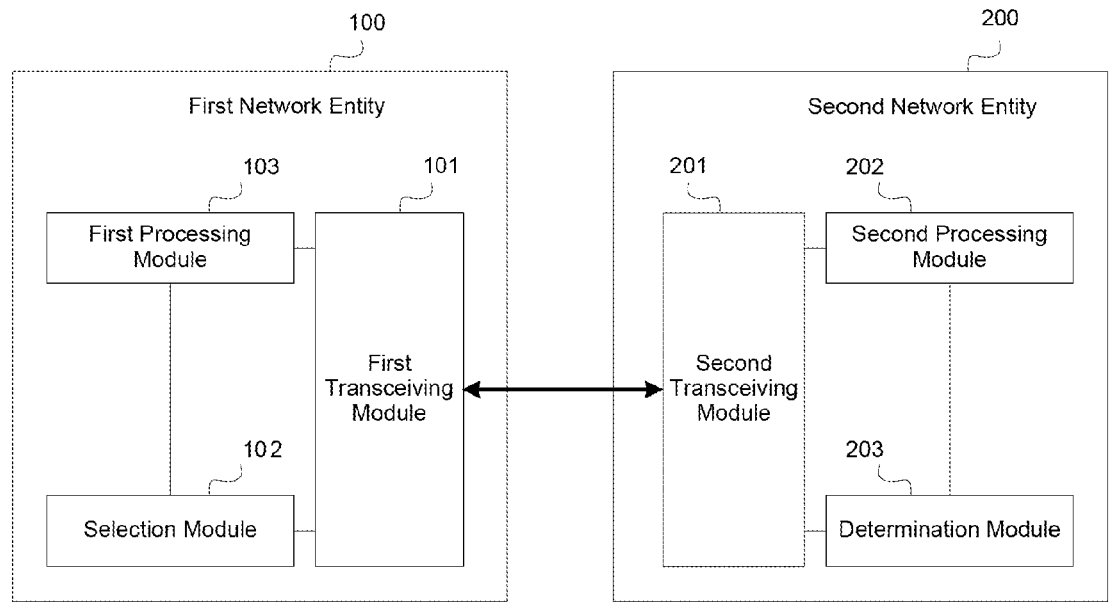
FIG. 3 and FIG. 4 are two main structures of systems for negotiating an SDP version according to an embodiment of the present invention, respectively.

The present invention also provides a system for negotiating an SDP version. Referring to FIG. 3, it shows a specific structure of the system, including a first network entity 100 and a second network entity 200.

The first network entity 100 includes a first transceiving module 101 and a module configured to select an SDP version to be used that is supported by both the first network entity and the peer end, i.e., the second network entity 200, e.g., a selection module 102 as illustrated in FIG. 3. The selection module 102 sends the information of the SDP version to be used to the second network entity 200 via the first transceiving module 101.

Corresponding to a first method for obtaining the information of the SDP version supported by the second network entity 200, the first network entity 100 further includes a module configured to request the peer end, i.e. the second network entity 200 for the information of the SDP version supported by the second network entity 200, e.g., a first processing module 103 as illustrated in FIG. 3; accordingly, the second network entity 200 includes a second transceiving module 201 that is a module configured to receive the information of the SDP version to be used.

The second network entity 200 further includes a module configured to return the information of the SDP version supported by the second network entity to the first network entity, e.g., a second processing module 202 as illustrated in FIG. 3.

The second network entity 200 further includes a module configured to determine whether the corresponding SDP version to be used is supported by the second network entity, e.g., a determination module 203 as illustrated in FIG. 3.

Since the second network entity 200 may return a success response of negotiation when the negotiation is successful, and does not response when the negotiation is failed, i.e., does not return a failure response of negotiation, the second network entity 200 further includes a module configured to return a success response of negotiation to the first network entity according to the determination result.

Since the second network entity 200 may not response when the negotiation is successful, i.e., does not return a success response, but return a failure response when the negotiation is failed, the second network entity 200 further includes a module configured to return a failure response of negotiation to the first network entity according to the determination result.

Of course, both modules configured to return a success response and configured to return a failure response may be included or a module configured to return a success response and a failure response may be collectively provided, such as the second processing module 202 as illustrated in FIG. 3.

Figure 4:
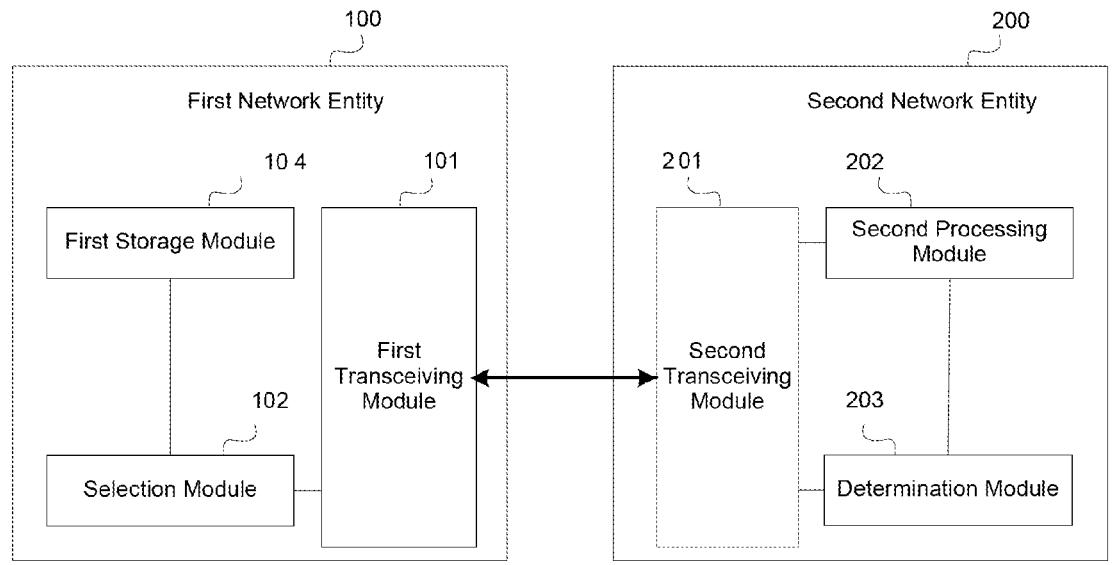

Referring to FIG. 4, it shows a second method for presetting the information of the SDP version supported by the second network entity 200. The first network entity 100 includes a first storage module 104 rather than the first processing module 103, the first storage module 104 storing the preset information of all SDP versions supported by the second network entity. A selection module 102 selects an SDP version to be used according to the information of the SDP version supported by the second network entity that is preset in the first storage module 104.

The first network entity 100 may be a media gateway controller, and the second network entity 200 may be a media gateway, wherein the media gateway controller and the media gateway communicate with each other by using the H.248 protocol.

Through a first network entity selecting an SDP version to be used that is supported by both the first network entity and the second network entity, and indicating the second network entity of information of the SDP version, the method, system and network entity for negotiating an SDP version according to an embodiment of the present invention enable the two communication parties to negotiate an SDP version supported by both applications. Especially when the H.248 protocol is applied, by extending a property parameter, the negotiation process between the media gateway controller and the media gateway can be conveniently achieved.

The present invention also provides a method for obtaining information of an SDP version, including the following steps:

the first network entity requests the second network entity for information of an SDP version supported by the second network entity; and the second network entity returns information of the SDP version supported by the second network entity to the first network entity in response to the request.

According to the H.248 protocol, a property parameter, e.g., a version parameter belonging to an SDP version packet, is extended for representing the supported SDP version. The value of the version parameter is an integer, and may use directly the RFC number used to define the SDP by the IETF, e.g., a value, 2327, represents that RFC2327 is supported, a value, 3266, represents that RFC3266 is supported (and implies that RFC2327 is also supported), and a value, 4566, represents that RFC4566 is supported. The default value is 2377. The property parameter of the SDP version is a termination state parameter configured in a termination state of the root termination, and is a readable and writeable parameter.

Figure 5:
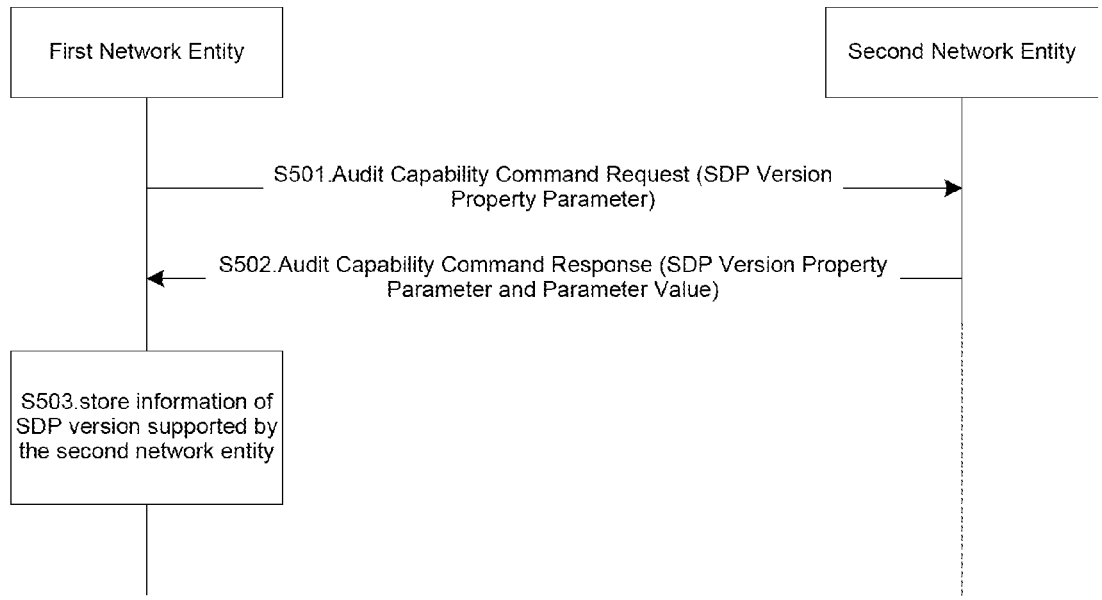
FIG. 5 is a main flowchart of a method for obtaining information of an SDP version according to an embodiment of the present invention.

As illustrated in FIG. 5, a method for obtaining information of an SDP version according to an embodiment of the present invention includes the following steps:

Step S501: The first network entity sends an audit capability command request to the second network entity, the audit capability command request carrying a newly defined property parameter of an SDP version.

Step S502: According to the audit capability command request, the second network entity returns the information of the SDP version supported by the second network entity to the first network entity as carried in a command response of the command request, wherein a property parameter of the SDP version is provided in the command response, and the information of the SDP version supported by the second network entity is used as the value of the property parameter.

Step S503: The first network entity stores locally the received information of the SDP version supported by the second network entity.

A scenario for applying the above technical scheme is that the first network entity is an MGC, and the second network entity is an MG. If the MGC desires to confirm the SDP version possibly supported by the MG, the MGC should send an audit capability command request with respect to the above property parameter to the second network entity, and then the MG returns the SDP versions supported by the MG to the MGC in a corresponding command response.

An example of typical application is as follows.

After the control association is established between the MGC and the MG, if the MGC wants to obtain information of an SDP version supported by the MG, the MGC sends an audit capability command request with respect to the above version property parameter of the SDP version packet to the MG, and then the MG returns the value of the version property parameter of the SDP version packet in a corresponding command response as a list including 2327 and 3266, i.e., the MG supports RFC2327 or RFC3266, but does not support RFC4566.

Figure 6:
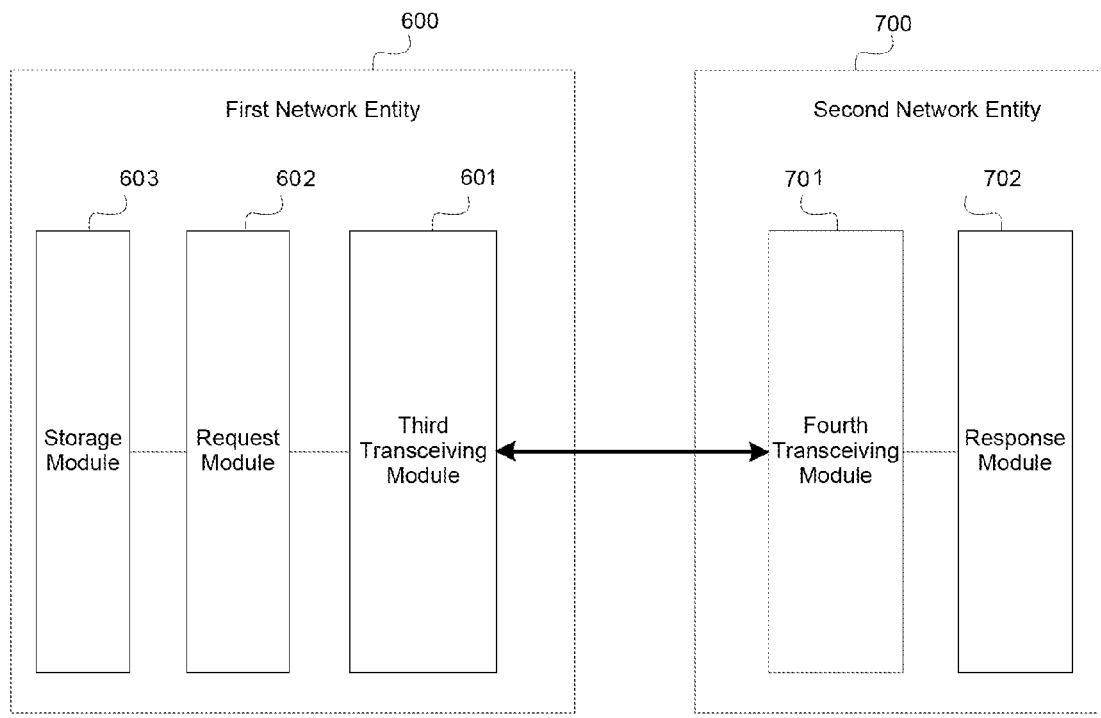
FIG. 6 is a main structure of a system for obtaining information of an SDP version according to an embodiment of the present invention.

As illustrated in FIG. 6, the present provides a system for obtaining information of an SDP version accordingly, including a first network entity 600 and a second network entity 700.

The first network entity 600 includes a third transceiving module 601 configured to transceive information.

The first network entity 600 further includes a module configured to request the second network entity 700 for the information of the SDP version supported by the second network entity, e.g., a request module 602 as illustrated in FIG. 6.

The first network entity 600 further includes a module configured to store the information of the SDP version supported by the second network entity 700, e.g., a storage module 603 as illustrated in FIG. 6.

The second network entity 700 includes a fourth transceiving module 701 configured to transceive information.

The second network entity 700 further includes a module configured to return the information of the SDP version supported by the second network entity to the first network entity 600 via the fourth transceiving module 701, e.g., a response module 702 as illustrated in FIG. 6.

In the above system, the first network entity 600 may be a media gateway controller, and the second network entity 700 may be a media gateway, wherein the media gateway controller and the media gateway communicate with each other by the H.248 protocol.

Through the first network entity requesting the second network entity for the information of the SDP version supported by the second network entity, and obtaining the information of the SDP version supported by the second network entity, the method, system and network entity for obtaining information of an SDP version according to an embodiment of the present invention enable a communication party to obtain information of an SDP version supported by the other communication party. Especially when the H.248 protocol is applied, by extending a property parameter, the media gateway controller may easily obtain information of the SDP version supported by the media gateway.

Apparently, various modifications and variations may be made to the present invention by those skilled in the art without departing from the scope of the present invention. Therefore, the present invention is intended to cover these modifications and variations provided that the modifications and variations fall in the scope of the claims and equivalents of the present invention.

What is claimed is:

1. In a packet network which has a separation of call control plane and service bearing plane, a media gateway controller (MGC) provides call control function and a media gateway (MG) provides service bearing function, a method for negotiating a session description protocol (SDP) version between the MGC and the MG, comprising:

sending, by the MGC using H.248 protocol, an audit capability command request to the MG to request for information of all SDP versions supported by the MG, wherein the audit capability command request carries a property parameter instructing the MG to return information of all the SDP versions supported by the MG;

receiving, by the MGC-using H.248 protocol, an audit capability command response from the MG which contains information of all SDP versions supported by the MG;

determining, by the MGC, based on the received information of all SDP versions supported by the MG, an SDP version to be used, which is supported by both the MGC and the MG;

sending, by the MGC, a modify request containing the determined SDP version to be used as a value of the property parameter to the MG; and one of the following:

receiving, by the MGC, a success response related to SDP version negotiation, after the MG confirms that the SDP version to be used is supported; or receiving, by the MGC, a failure response related to SDP version negotiation, after the MG confirms that the SDP version to be used is not supported.

2. In a packet network which has a separation of call control plane and service bearing plane, a media gateway controller (MGC) provides call control function and a media gateway (MG) provides service bearing function, a system for negotiating a session description protocol (SDP) version between the MGC and the MG, comprising the MGC having a processor and the MG, wherein the MGC and the MG communicate with each other by using H. 248 protocol, wherein the MGC comprises a processor configured to:

send an audit capability command request to the MG to request for information of all SDP versions supported by the MG, wherein the audit capability command request carries a property parameter-instructing the MG to return information of all the SDP versions supported by the MG, receive an audit capability command response from the MG which contains information of all SDP versions supported by the MG, determine an SDP version to be used based on the received information of all SDP versions supported by the MG, which is supported by both the MGC and the MG, send a modify request containing the determined SDP version to be used as a value of the property parameter to the MG; and one of the following:

receive a success response related to SDP version negotiation, after the MG confirms that the SDP version to be used is supported; or receive a failure response related to SDP version negotiation, after the MG confirms that the SDP version to be used is not supported;

wherein the MG returns a command response containing information of an SDP version supported by the MG to the MGC in response to the audit capability command request.

3. The system of claim 2, wherein the MG is further configured to return a response indicative of a success in negotiation to the MGC when it is confirmed that the SDP version to be used is supported; or further configured to return a response indicative of a failure in negotiation to the MGC when it is confirmed that the SDP version to be used is not supported.

4. The system of claim 2, wherein the MGC further comprises a memory configured to store preset information of multiple SDP versions supported by the MG.

5. In a packet network which has a separation of call control plane and service bearing plane, a media gateway controller (MGC) provides call control function and a media gateway (MG) provides service bearing function, wherein the MGC comprises:

a first transmitter that sends an audit capability command request to the MG to request for information of all session description protocol (SDP) versions supported by the MG wherein the audit capability command request carries a property parameter instructing the MG to return information of all the SDP versions supported by the MG;

a receiver, that receives an audit command response from the MG, which contains information of all SDP versions supported by the MG;

a selector, that determines, based on the received information of all SDP versions supported by the MG, an SDP version to be used, which is supported by both the MGC and the MG; and a second transmitter that sends a modify request containing the determined SDP version to be used as a value of the property parameter to the MG, wherein the MGC receives a success response related to SDP version negotiation after the MG confirms that the SDP version to be used is supported; and wherein the MGC receives a failure response related to SDP version negotiation after the MG confirms that the SDP version to be used is not supported.

* * * * *